United States Patent [19]

Rollmann

[11] 4,431,746

[45] Feb. 14, 1984

[54] PREPARING METAL-EXCHANGED HIGHLY SILICEOUS POROUS CRYSTALLINE MATERIALS

[75] Inventor: Louis D. Rollmann, Princeton, N.J.

[73] Assignee: Mobil Oil Corporation, New York, N.Y.

[21] Appl. No.: 277,495

[22] Filed: Jun. 26, 1981

[51] Int. Cl.$^3$ .......................... B01J 29/12; B01J 29/16
[52] U.S. Cl. .......................................... 502/73; 502/74; 502/77; 423/112
[58] Field of Search ..................... 252/455 Z; 423/112

[56] References Cited

U.S. PATENT DOCUMENTS

| | | | |
|---|---|---|---|
| 3,013,987 | 12/1961 | Castor et al. | 252/455 Z |
| 3,013,990 | 12/1961 | Break et al. | 252/455 Z |
| 3,308,069 | 3/1967 | Wadlinger | 252/455 Z |
| 3,794,598 | 2/1974 | Schlaffer | 423/112 X |
| 3,923,880 | 12/1975 | Westlake et al. | 260/532 |
| 4,152,303 | 8/1980 | Cohen et al. | 252/474 |
| 4,222,898 | 9/1980 | Noltes et al. | 252/447 |
| 4,297,243 | 10/1981 | Moorehead | 423/112 X |

*Primary Examiner*—Carl F. Dees
*Attorney, Agent, or Firm*—Alexander J. McKillop; Michael G. Gilman; Van D. Harrison, Jr.

[57] ABSTRACT

Highly siliceous porous crystalline zeolite materials having a mole ratio of silica to alumina of at least 20 are metal-impregnated by contacting the zeolite with a solution (aqueous or inorganic) of a metal complex having a zero or uncommon low ion charge.

18 Claims, No Drawings

PREPARING METAL-EXCHANGED HIGHLY SILICEOUS POROUS CRYSTALLINE MATERIALS

BACKGROUND OF THE INVENTION

1. Field of the Invention

This invention relates to the preparation of metal-exchanged highly siliceous porous crystalline materials. More specifically, this invention relates to the preparation of transition metal-exchanged zeolite catalysts.

2. Description of the Prior Art

Zeolitic materials, both natural and synthetic, have been demonstrated in the past to have catalytic properties for various types of hydrocarbon conversion. Certain zeolitic materials are ordered, porous crystalline aluminosilicates having a definite crystalline structure as determined by X-ray diffraction, within which there are a large number of smaller cavities which may be interconnected by a number of still smaller channels or pores. These cavities and pores are uniform in size within a specific zeolitic material. Since the dimensions of these pores are such as to accept for adsorption molecules of certain dimensions while rejecting those of larger dimensions, these materials have come to be known as "molecular sieves" and are utilized in a variety of ways to take advantage of these properties.

Such molecular sieves, both natural and synthetic, include a wide variety of positive ion-containing crystalline aluminosilicates. These aluminosilicates can be described as a rigid three-dimensional framework of $SiO_4$ and $AlO_4$ in which the tetrahedra are cross-linked by the sharing of oxygen atoms whereby the ratio of the total aluminum and silicon atoms to oxygen atoms is 1:2. The electrovalence of the tetrahedra containing aluminum is balanced by the inclusion in the crystal of a cation, for example an alkali metal or an alkaline earth metal cation. This can be expressed wherein the ratio of aluminum to the number of various cations, such as Ca/2, Sr/2, Na, K or Li, is equal to unity. One type of cation may be exchanged either entirely or partially with another type of cation utilizing ion exchange techniques in a conventional manner. By means of such cation exchange, it has been possible to vary the properties of a given aluminosilicate by suitable selection of the cation. The spaces between the tetrahedra are occupied by molecules of water prior to dehydration.

Prior art techniques have resulted in the formation of a great variety of synthetic aluminosilicates. The aluminosilicates have come to be designated by letter or other convenient symbols, as illustrated by zeolite A (U.S. Pat. No. 2,882,243), zeolite X (U.S. Pat. No. 2,882,244), zeolite Y (U.S. Pat. No. 3,130,007), zeolite ZK-5 (U.S. Pat. No. 3,247,195), zeolite ZK-4 (U.S. Pat. No. 3,314,752), zeolite ZSM-5 (U.S. Pat. No. 3,702,886), zeolite ZSM-11 (U.S. Pat. No. 3,709,979), zeolite ZSM-12 (U.S. Pat. No. 3,832,449), zeolite ZSM-20 (U.S. Pat. No. 3,972,983), ZSM-35 (U.S. Pat. No. 4,016,245), zeolites ZSM-21 and ZSM-38 (U.S. Pat. No. 4,046,859), and zeolite ZSM-23 (U.S. Pat. No. 4,076,842), merely to name a few.

The $SiO_2/Al_2O_3$ ratio of a given zeolite is often variable. For example, zeolite X can be synthesized with $SiO_2/Al_2O_3$ ratios of from 2 to 3; zeolite Y, from 3 to about 6. In some zeolites, the upper limit of the $SiO_2/Al_2O_3$ ratio is unbounded. ZSM-5 is one such example wherein the $SiO_2/Al_2O_3$ ratio is at least 5, up to infinity. U.S. Pat. No. 3,941,871 now Re. No. 29,948, discloses a porous crystalline silicate made from a reaction mixture containing no deliberately added alumina in the recipe and exhibiting the X-ray diffraction pattern characteristic of ZSM-5 type zeolites. U.S. Pat. Nos. 4,061,724, 4,073,865 and 4,104,294 describe crystalline silicates or organosilicates of varying alumina and metal content.

More recently, other techniques have been developed for preparing a crystalline aluminosilicate having a high mole ratio of silica to alumina.

U.S. Pat. No. 4,112,056, for example, discloses a technique for preparing zeolites having a high silica/alumina ratio. The zeolite is crystallized from a silica-rich reaction mixture containing a source or sources of an alkali metal oxide, organic nitrogen-containing oxides, an oxide of silicon, and water. As crystallization progresses one or more sources of aluminum ions are added to maintain the concentration of aluminum ions at a steady state.

U.S. Pat. No. 3,937,791 discloses a method of removing alumina from a zeolite which comprises heating the zeolite in the presence of a cationic form of chromium in an aqueous, acidic solution of above 0.01 Normal at a pH of less than 3.5 for a time sufficient to remove the alumina. Zeolites having high silica to alumina ratios are valuable catalysts in various processes for converting hydrocarbon compounds and oxygenates such as methanol. Such processes include, for example, alkylation of aromatics with olefins, aromatization of normally gaseous olefins and paraffins, aromatization of normally liquid low molecular weight paraffins and olefins, isomerization of aromatics, paraffins and olefins, disproportionation of aromatics, transalkylation of aromatics, oligomerization of olefins and cracking and hydrocracking. All of the foregoing catalytic processes are of value since they result in upgrading of the organic charge being processed.

It is desirable in some instances to add a hydrogenation/dehydrogenation component to the zeolite of high silica-to-alumina ratio. In a common procedure, the zeolite and a solution of an exchangable metal salt have been contacted over a prolonged period of time and sometimes at elevated temperature to effect the ion exchange with metals in the zeolite structure. The amount of the hydrogenation/dehydrogenation component employed is not narrowly critical and can range from about 0.01 to about 30 weight percent based on the entire catalyst. A variety of hydrogenation components may be combined with either the zeolite and/or matrix employing well known techniques such as base exchange, impregnation, coprecipitation, cogellation, mechanical admixture of one component with the other and the like. The hydrogenation component can include metals, oxides and sulfides of metals of the transition metal groups, i.e., iron, cobalt, nickel, platinum, palladium, ruthenium, rhodium, iridium and osmium. Pretreatment before use varies depending on the hydrogenation component present. For example, with components such as nickel-tungsten, cobalt-molybdenum, platinum and palladium, the catalyst desirably may be sulfided. With metals like platinum or palladium, a hydrogenation step may also be employed. These techniques are well known in the art and are accomplished in a conventional manner.

It has been found, however, that base exchange and impregnation processes utilizing solutions (aqueous and organic solvent) of conventional transition metal complexes when practiced on zeolites of a highly siliceous nature are less effective than when practiced on the hitherto conventional zeolites having silica to alumina mole ratios of 2 to less than about 15. On the other hand, transition metal complexes of uncommon, low ion charge or without charge, as described herein, are exceptionally effective. Although I do not wish to be bound by any theory, it is believed the increased hydrophobic nature and decreased framework aluminum density are responsible for this reduced effectiveness of base exchanging metals through the use of conventional metal complexes.

SUMMARY OF THE INVENTION

It has now been discovered that the ion exchange of transition metals with highly siliceous porous crystalline zeolite materials is enhanced by utilizing transition metal complexes of low or of zero ion charge. Accordingly, this invention constitutes in the broadest sense a process for metal-impregnating highly siliceous porous crystalline zeolite materials having a silica to alumina mole ratio greater than 20 comprising contacting the zeolite with a solution of a metal complex having a zero or uncommon low ion charge.

DESCRIPTION OF THE INVENTION

The present invention offers a means of incorporating transition metals into highly siliceous porous crystalline materials containing from 10 ppm to about 8% alumina on a framework oxide basis.

The crystalline materials utilized herein are members of a novel class of zeolitic materials which exhibit unusual properties. Although these zeolites have unusually low alumina contents, i.e. high silica to alumina mole ratios, they are very active even when the silica to alumina mole ratio exceeds 30. The activity is surprising since catalytic activity is generally attributed to framework aluminum atoms and/or cations associated with these aluminum atoms. These zeolites retain their crystallinity for long periods in spite of the presence of steam at high temperature which induces irreversible collapse of the framework of other zeolites, e.g. of the X and A type. Furthermore, carbonaceous deposits, when formed, may be removed by burning at higher than usual temperatures to restore activity. These zeolites, used as catalysts, generally have low coke-forming activity and therefore are conducive to long times on stream between regenerations by burning carbonaceous deposits with oxygen-containing gas such as air.

An important characteristic of the crystal structure of this novel class of zeolites is that it provides a selective constrained access to and egress from the intracrystalline free space by virtue of having an effective pore size intermediate between the small pore Linde A and the large pore Linde X, i.e. the pore windows of the structure are of about a size such as would be provided by 10-membered rings of silicon atoms interconnected by oxygen atoms. It is to be understood, of course, that these rings are those formed by the regular disposition of the tetrahedra making up the anionic framework of the crystalline zeolite, the oxygen atoms themselves being bonded to the silicon (or aluminum, etc.) atoms at the centers of the tetrahedra.

The silica to alumina mole ratio referred to may be determined by conventional analysis. This ratio is meant to represent, as closely as possible, the ratio in the rigid anionic framework of the zeolite crystal and to exclude aluminum in the binder or in cationic or other form within the channels. Although zeolites with silica to alumina mole ratios of at least 20 are useful, ratios above about 30 are preferred. In some instances, it is desirable to use zeolites having substantially higher silica/alumina ratios, e.g. 1600 and above. In addition, zeolites as otherwise characterized herein but which are substantially free of aluminum, that is zeolites having silica to alumina mole ratios of up to infinity, are found to be useful and even preferable in some instances. Such "high silica" or "highly siliceous porous crystalline materials" are intended to be included within this description. Also included within this definition and the scope of this invention are substantially pure silica analogs of the useful zeolites described herein, that is to say those zeolites having no measurable amount of aluminum (silica to alumina mole ratio of infinity) but which otherwise embody the characteristics disclosed.

The novel class of zeolites, after activation, acquire an intracrystalline sorptive capacity for normal hexane which is greater than that for water, i.e. they exhibit "hydrophobic" properties. This hydrophobic character can be used to advantage in some applications.

The novel class of zeolites useful herein have an effective pore size such as to freely sorb normal hexane. In addition, the structure may provide constrained access to larger molecules. It is sometimes possible to judge from a known crystal structure whether a suitable pore size exists. For example, if the only pore windows in a crystal are formed by 6-membered rings of silicon and aluminum atoms, then access by molecules of cross-section equal to or larger than normal hexane is excluded and the zeolite is not of the desired type. Windows of 10- and 12-membered rings are preferred, although in some instances excessive puckering of the rings or pore blockage in the former may render these zeolites ineffective.

The novel class of zeolite structures defined herein is exemplified by zeolite Beta, ZSM-4, ZSM-5, ZSM-11, ZSM-12, ZSM-23, ZSM-35, ZSM-38, ZSM-48, dealuminized or very high silica/alumina mordenite or synthetic faujasite, and other similar materials.

Zeolite Beta is described in U.S. Pat. No. Re. 28,341. That description, and in particular the x-ray diffraction pattern disclosed therein, is incorporated herein by reference.

ZSM-4 is described in U.S. Pat. Nos. 3,923,639 and 4,021,447 the entire contents of which, and in particular the x-ray diffraction patterns disclosed therein is incorporated herein by reference.

ZSM-5 is described in greater detail in U.S. Pat. Nos. 3,702,886 and Re. 29,948. The entire descriptions contained within those patents, particularly the X-ray diffraction pattern of therein disclosed ZSM-5, are incorporated herein by reference.

ZSM-11 is described in U.S. Pat. No. 3,709,979. That description, and in particular the X-ray diffraction pattern of said ZSM-11, is incorporated herein by reference.

ZSM-12 is described in U.S. Pat. No. 3,832,449. That description, and in particular the X-ray diffraction pattern disclosed therein, is incorporated herein by reference.

ZSM-23 is described in U.S. Pat. No. 4,076,842. The entire content thereof, particularly the specification of the X-ray diffraction pattern of the disclosed zeolite, is incorporated herein by reference.

ZSM-35 is described in U.S. Pat. No. 4,016,245. The description of that zeolite, and particularly the X-ray diffraction pattern thereof, is incorporated herein by reference.

ZSM-38 is more particularly described in U.S. Pat. No. 4,046,859. The description of that zeolite, and particularly the specified X-ray diffraction pattern thereof, is incorporated herein by reference.

ZSM-48 is more particularly described in pending U.S. application Ser. No. 56,754 filed July 12, 1979, and in the pending U.S. application filed Nov. 18, 1980 Ser. No. 207,897 which is a continuation of application Ser. No. 64,703, filed Aug. 8, 1979, the entire contents of both of which are incorporated herein by reference.

ZSM-48 can be identified, in terms of moles of anhydrous oxides per 100 moles of silica, as follows:

$$(0-15)RN:(0-1.5)M_{2/n}O:(0-2)Al_2O_3:(100)SiO_2$$

wherein:

M is at least one cation having a valence n; and
RN is a $C_1-C_{20}$ organic compound having at least one amine functional group of $pK_a \geq 7$.

It is recognized that, particularly when the composition contains tetrahedral framework aluminum, a fraction of the amine functional groups may be protonated. The doubly protonated form, in conventional notation, would be $(RNH)_2O$ and is equivalent in stoichiometry to $2RN+H_2O$.

The characteristic X-ray diffraction pattern of the synthetic zeolite ZSM-48 has the following significant lines:

| Characteristic Lines of ZSM-48 | |
| --- | --- |
| d (Angstroms) | Relative Intensity |
| 11.9 | W-S |
| 10.2 | W |
| 7.2 | W |
| 5.9 | W |
| 4.2 | VS |
| 3.9 | VS |
| 3.6 | W |
| 2.85 | W |

These values were determined by standard techniques. The radiation was the K-alpha doublet of copper, and a scintillation counter spectrometer with a strip chart pen recorder was used. The peak heights, I, and the positions as a function of 2 times theta, where theta is the Bragg angle, were read from the spectrometer chart. From these, the relative intensities, 100 $I/I_o$, where $I_o$ is the intensity of the strongest line or peak, and d (obs.), the interplanar spacing in angstroms, corresponding to the recorded lines, were calculated. In the foregoing table the relative intensities are given in terms of the symbols W=weak, VS=very strong and W-S=weak-to-strong. Ion exchange of the sodium ion with cations reveals substantially the same pattern with some minor shifts in interplanar spacing and variation in relative intensity. Other minor variations can occur depending on the silicon to aluminum ratio of the particular sample, as well as if it has been subjected to thermal treatment.

The ZSM-48 can be prepared from a reaction mixture containing a source of silica, water, RN, an alkali metal oxide (e.g. sodium) and optionally alumina. The reaction mixture should have a composition, in terms of mole ratios of oxides, falling within the following ranges:

| REACTANTS | BROAD | PREFERRED |
| --- | --- | --- |
| $Al_2O_3/SiO_2 =$ | 0 to 0.02 | 0 to 0.01 |
| $Na/SiO_2 =$ | 0 to 2 | 0.1 to 1.0 |
| $RN/SiO_2 =$ | 0.01 to 2.0 | 0.05 to 1.0 |
| $OH^-/SiO_2 =$ | 0 to 0.25 | 0 to 0.1 |
| $H_2O/SiO_2 =$ | 10 to 100 | 20 to 70 |
| $H^+(added)SiO_2 =$ | 0 to 0.2 | 0 to 0.05 | wherein RN is a $C_1-C_{20}$ organic compound having amine functional group of $pK_a \geq 7$. The mixture is maintained at 80°–250° C. until crystals of the material are formed. $H^+$(added) is moles acid added in excess of the moles of hydroxide added. In calculating $H^+$(added) and OH values, the term acid ($H^+$) includes both hydronium ion, whether free or coordinated, and aluminum. Thus aluminum sulfate, for example, would be considered a mixture of aluminum oxide, sulfuric acid, and water. An amine hydrochloride would be a mixture of amine and HCl. In preparing the highly siliceous form of ZSM-48 no alumina is added. Thus, the only aluminum present occurs as an impurity in the reactants.

Preferably, crystallization is carried out under pressure in an autoclave or static bomb reactor, at 80° C. to 250° C. Thereafter, the crystals are separated from the liquid and recovered. The composition can be prepared utilizing materials which supply the appropriate oxide. Such compositions include sodium silicate, silica hydrosol, silica gel, silicic acid, RN, sodium hydroxide, sodium chloride, aluminum sulfate, sodium aluminate, aluminum oxide, or aluminum itself. RN is a $C_1-C_{20}$ organic compound containing at least one amine functional group of $pk_a \geq 7$, as defined above, and includes such compounds as $C_3$14 $C_{18}$ primary, secondary, and tertiary amines, cyclic amine (such as piperidine, pyrrolidine and piperazine), and polyamines such as $NH_2-C_nH_{2n}-NH_2$ wherein n is 4–12.

The original cations can be subsequently replaced, at least in part, by calcination and/or ion exchange with another cation. Thus, the original cations are exchanged into a hydrogen or hydrogen ion precursor form. For example, it is contemplated to exchange the original cations with ammonium ions or with hydronium ions.

It is to be understood that by incorporating by reference the foregoing patents to describe examples of specific members of the novel class with greater particularity, it is intended that identification of the therein disclosed crystalline zeolites be resolved on the bases of their respective X-ray diffraction patterns. As discussed above, the present invention contemplates utilization of such catalysts wherein the mole ratio of silica to alumina is essentially unbounded. The incorporation of the identified patents should therefore not be construed as limiting the disclosed crystalline zeolites to those having the specific silica-alumina mole ratios discussed therein, it now being known that such zeolites may be substantially aluminum-free and yet, having the same crystal structure as the disclosed materials, may be useful or even preferred in some applications. It is the crystal structure, as identified by the X-ray diffraction "fingerprint", which establishes the identity of the specific crystalline zeolite material.

The zeolites described, when prepared in the presence of organic cations, are often substantially catalytically inactive and are sometimes resistant to base exchange, possibly because the intra-crystalline free space is occupied by organic cations from the forming solution. If necessary, these organics may be removed by heating in an inert atmosphere at 540° C. for one hour, for example, followed by base exchange with ammonium salts if the ammonium form of the zeolite is desired. When synthesized in the alkali metal form, the zeolite is often conveniently converted to the hydronium form or to the ammonium form by acid treatment or by ammonium ion exchange, but in some cases the as-synthesized, even organic cation containing form may be suitable for exchange directly with the complexes of this invention.

Zeolite structures of high silica/alumina ratio may also be obtained by dealuminization and are included in the present invention. Dealuminization procedures are well known in the zeolite art and have been described for synthetic faujasite and for mordenite structures, for example, by J. Scherzer in the Journal of Catalysis, 54, 285 (1978) and by R. W. Olsson and L. D. Rollmann in Inorganic Chemistry, 16, 651 (1977), respectively both of which publications are incorporated herein by reference.

Natural zeolites may sometimes be converted to zeolite structures of the class herein identified by various activation procedures and other treatments such as base exchange, steaming, alumina extraction and calcination, alone or in combinations. Natural minerals which may be so treated include ferrierite, brewsterite, stilbite, dachiardite, epistilbite, heulandite, and clinoptilolite.

The preferred crystalline zeolite structures for utilization herein include Beta, ZSM-4, ZSM-5, ZSM-11, ZSM-12, ZSM-23, ZSM-35, ZSM-38, ZSM-48, mordenite and synthetic faujasite.

In practicing a particularly desired chemical conversion process, it may be useful to incorporate the above-described crystalline zeolite with a matrix comprising another material resistant to the temperature and other conditions employed in the process. Such matrix material is useful as a binder and imparts greater resistance to the catalyst for the severe temperature, pressure and reactant feed stream velocity conditions encountered in many cracking processes. Exchange may precede or follow formation of the aggregate.

Although the principles apply more broadly, the transition metals particularly suited to the process of this invention include titanium, vanadium, chromium, manganese, iron, cobalt, nickel, copper, zinc, zirconium, niobium, molybdenum, ruthenium, rhodium, palladium, osmium, iridium, platinum, tantalum, tungsten, and rhenium. Other metals not in the transition series but useful in the invention include uranium and the lanthanides.

Virtually any carrier liquid which is a good solvent for the desired metal complex may be used so long as it does not destroy the zeolite or where present, the binder. Preferred solvents are of molecular dimensions such that they can freely penetrate the pores of the zeolite selected. Organic solvents are particularly preferred, due to the hydrophobic properties of siliceous zeolites.

An extensive variety of transition metal complexes has been used in the prior art both to synthesize catalysts and to simply explore scientific principles. Without exception however, ion exchange studies have utilized zeolites of low $SiO_2/Al_2O_3$ ratio, usually less than about 6, and have shown no advantages to the use of complexes such as described below in achieving effective exchange. One scientific study published by R. M. Barrer and R. P. Townsend in the Journal of the Chemical Society, Faraday Transactions, I (1976), page 2657, reported a maximal level of exchange of 50% observed in mordenite ($SiO_2/Al_2O_3=10.7$) with cuprammine (II), zincammine (II) and hexamminecobalt (III) ions, attributed to an "ion sieving effect".

Commercial catalysts are invariably prepared with readily available complexes of common ionic charge, like those used by Barrer and Townsend. Simple application of these techniques (with these conventional complexes) to the class of siliceous zeolites showed them to be ineffective for metal incorporation and led to discovery of the particular advantages of a sub-set of complexes, those having uncommon low charge, for ion exchange.

"Uncommon low charge" is a term easily appreciated by those skilled in the art specializing in coordination or organometallic chemistry but it is intuitive and demands clarification. For many transition metals, the term "uncommon low charge" applies to those complexes (or molecules) having a charge of zero or positive one, but not a charge of positive two or above. Included in this group are vanadium, manganese, iron, cobalt, nickel, copper, zinc, palladium, platinum, uranium, ruthenium, and osmium. With other metals, charges of zero, one, and two could be considered uncommon. These include rhodium, iridium, chromium, titanium, zirconium, niobium, molybdenum, tantalum, tungsten, rhenium and the lanthanides.

In addition to the numerous simple complexes with water, ammonia, amines, oxygen- and nitrogen-chelate complexes soluble and stable in organic solvents such as tetrahydrofuran, alcohols, amides, dimethylsulfoxide, ketones and acetonitrile, for example, will be useful in this regard. Among the many suitable compounds soluble in organic solvents are carbonyl and phosphine complexes, together with organometallics like bis-benzene chromium, $\pi$-allyl chromium, chromocene, ferrocene, their one-electron oxidation products (the corresponding +1 cations), and many others. In selecting compounds suitable for incorporation into a zeolite framework, one must of course be cognizant of the constraint on compound size. For a given zeolite, pore size establishes the maximum critical dimensions that a compound can have in order to be admitted into the intracrystalline void volume.

The process is conducted by preparing an aqueous or organic solvent solution of the metal complex and contacting the zeolite with the solution at a temperature between the freezing point of the solvent and about 100° C. such that between 5 and 100 percent, preferably between 10 and 90 percent, by weight of the original metal cations in the zeolite are exchanged with the metal complex. Depending on its intended use, the highly siliceous crystalline zeolite may be removed from the contacting solution and may be washed with solvent. Depending again on its intended use, the catalyst is then calcined in air or in an inert atmosphere at temperature ranging from 100° to 600° C. If desired, the catalyst can be recontacted with the solution of metal complex to effect an increased concentration of metal in the final catalyst product.

The catalysts prepared in accordance with the invention find extensive utility in a wide variety of hydrocarbon conversion processes including isomerization, dealkylation, alkylation, disproportionation, hydration of olefins, amination of olefins, hydrocarbon oxidation, dehydrogenation, dehydration of alcohols, desulfurization, hydrogenation, hydroforming, reforming, hydrocracking, oxidation y, polymerization and the like. The catalysts are exceptionally stable and are particularly useful in such of the above and related processes carried out at temperatures ranging from ambient temperatures of 25° C. up to 800° C., including such processes in which the catalyst is periodically regenerated by burning off combustible deposits. Because of their high catalytic activities, the catalysts are especially useful for effecting various hydrocarbon conversion processes such as alkylation, for example, at relatively low temperatures with small amounts of catalyst, thus, providing a minimum of undesirable side reactions and operating costs.

EXAMPLE 1

This example shows that, for two cationic cobalt complexes of very similar size, the one with the uncommon low charge is much more effectively exchanged into the framework. The cobalt complexes were aqueous solutions of $Co(NH_3)_6^{3+}$ and $Co(NH_3)_4(CO_3)^+$ and the zeolite was ammonium exchanged ZSM-5 of a $SiO_2/Al_2O_3$ mole ratio of 67. A third, much larger cation, Co en$_3^{3+}$, was used to separate size effects from charge effects. To effect each exchange, 200 ml of a 0.1 molar solution of the appropriate cobalt ammonia complex and 5 grams of the ammonium exchanged zeolite were contacted at 25° C. for a period of 2 hours under constant stirring. Each sample was then filtered, washed and air dried at 25° C. The cobalt content was then determined. A second exchange was then performed with more of the cobalt ammonia complex solution, the contact period lasting overnight.

In one exchange, the singly charged complex replaced 19% of the ammonium ion (0.52% Co), whereas the triply charged analog replaced only 5% (0.05% Co). The blank, Co en$_3^{3+}$, replaced only 2%. In a second exchange, 40% of the ammonium ion was replaced by the +1 cation (1.1% Co), only 7% by the +3 analog (0.07%).

EXAMPLE 2

This example demonstrates the same effects with a different zeolite structure; ZSM-11, wherein the mole ratio of $SiO_2/Al_2O_3$ was 76. When the procedures of example 1 were repeated, the +1 cation replaced 41%, the +3 analog only 29%, of the ammonium ion and the larger Co en$_3^{3+}$ only 20% of the ammonium ion in a single exchange. In a second treatment, 98% exchange was effected with the +1 complex, but only 30% with the +3 species.

EXAMPLE 3

This example demonstrates that these effects are not true if a zeolite of a low $SiO_2/Al_2O_3$ ratio is similarly treated. The procedures of Example 1 were repeated with an ammonium mordenite, in which the $SiO_2/Al_2O_3$ mole ratio was 15.4. After one exchange with the +1 cation, only 15% of the NH$_4$ cations were replaced by cobalt whereas 63% replacement was effected by the same treatment with $Co(NH_3)_6^{3+}$. The very large Co en$_3^{3+}$ replaced only 14%. A second treatment with +1 cation was similarly ineffective (24% exchange) compared with the +3 analog (71%).

EXAMPLE 4

This example shows that the preference for low charge is present even with mordenite once the $SiO_2/Al_2O_3$ ratio is increased (in this example) to 54, by dealuminization. After one exchange, the sample prepared with +1 cation contained 0.4% Co; that with +3 analog, only 0.15%. After a second exchange, the Co contents were 1.0 and 0.19%, respectively.

EXAMPLE 5

This example demonstrates the principles with yet another zeolite, ZSM-12, of yet another $SiO_2/Al_2O_3$ ratio (95). One exchange with cobalt +1 cation charge yielded a zeolite containing 1.5% Co; with a cobalt cation of +3, charge, 0.36%. After a second exchange, the products contained 2.1 and 0.55% Co, respectively.

The data presented in Examples 1–5 show a striking correlation between size, charge and aluminum content. ZSM-5 (silica/alumina ratio equals 67) effectively excluded the trivalent cation $Co(NH_3)_6^{3+}$ but readily admitted the similarly sized monovalent analog $Co(NH_3)_4CO_3^+$. All four samples with high $SiO_2/Al_2O_3$ mole ratios showed this same preference for the singly charged cation. The lower $SiO_2/Al_2O_3$ mole ratio mordenite on the other hand preferred the trivalent complex, undoubtedly a reflection of the higher aluminum density along the mordenite pore (i.e., an aluminum density sufficient to charge-balance a +3 cation).

The $Co(NH_3)_6^{3+}$ exchange into NH$_4$-mordenite (60–70%) reflects the fact that not all the aluminum atoms in a mordenite framework are in tetrahedra bounding the 12-ring pore and available for exchange by large cations. It may be that dealuminization of a mordenite sample preferentially removes those aluminum tetrahedra lying on the channel walls, a suggestion which would readily explain the major decline in $Co(NH_3)_6^{3+}$ exchange on dealuminization with little change in that of $Co(NH_3)_4CO_3^+$.

These results show that exchange of a hypothetical $M(NH_3)_6^{n+}$ or $M(NH_3)_4^{n+}$ species into a 10-ring pore is constrained not by size but by charge and by the $SiO_2/Al_2O_3$ ratio of the specific zeolite considered.

EXAMPLE 6

This example demonstrates the use of low and uncommon valence states of a different transition element, chromium, in catalyst preparation. About 0.1 grams of chromium metal were dissolved in 14 cc of 1 normal NH$_4$Cl under a nitrogen blanket. Hydrogen (H$_2$) was evolved and a solution of divalent chromium was obtained. This solution was injected into a nitrogen-purged, evacuated flask containing 3.4 g of HZSM-5 ($SiO_2/Al_2O_3=78$). After 30 minutes with occasional mixing, the pale blue solid was filtered off. When the same experiment was conducted with an equivalent amount of trivalent $Cr(H_2O)_6Cl_3$, the solid was essentially white, indicating little chromium incorporation into the zeolite.

EXAMPLE 7

This example demonstrates the use of uncharged metal complexes in non-aqueous solvents. A solution of 0.3 g ferrocene (dicyclopentadienyliron) is an organic solvent was stirred under nitrogen gas with 3.3 g HZSM-5 (mole ratio of $SiO_2/Al_2O_3=78$) for about 30 minutes and was then allowed to stand overnight. The pale yellow solid was filtered, washed with 2,2-dimethylbutane, and air dried. A sample was calcined to destroy carbonaceous material. A few drops of water were added to wet the sample, and 10 cc 30% H$_2$O$_2$ were added. Vigorous gas evolution began from the reddish solid, confirming the significant presence of Fe. When the same experiment was conducted with the starting HZSM-5 sample, gas evolution was very slow and the solid was white.

EXAMPLE 8

This example demonstrates the preparation and use of a catalyst for ethylene polymerization. To a suspension of 2 grams of HZSM-5 zeolite ($SiO_2/Al_2O_3$ mole ratio=1600) in hexane under helium were added 0.12 g of chromocene (Dicyclopentadienyl chromium) in 2 ml toluene. The purple/brown color was absorbed into the solid. The same procedure was conducted in an autoclave, which was then heated to 70° C. and pressured to 200 psig with ethylene. After 1 hour, the autoclave was opened, and the hexane was evaporated leaving a white gelatinous solid mixture of polymer and catalyst.

What is claimed is:

1. A method of preparing a catalyst composition which comprises contacting a porous crystalline siliceous zeolite having a silica-to-alumina mole ratio greater than about 20 with a solution of a transition metal complex of uncommon low charge for a period of time sufficient to exchange a portion of said metal complex with a component of said zeolite.

2. The method of claim 1 wherein said metal complex is a complex having a charge of 0 to 1 and said metal is selected from the group consisting of vanadium, manganese, iron, cobalt, nickel, copper, zinc, palladium, platinum, uranium, ruthenium and osmium.

3. The method of claim 1 wherein said metal complex is a complex having a charge of 0 to 2 and said metal is selected from the group consisting of rhodium, iridium, titanium, zirconium, niobium, molybdenum, tantalum, tungsten, rhenium and the lanthanides.

4. The method of claim 1 wherein said metal complex contains a ligand selected from the group consisting of carbon monoxide, benzene, phosphine and ammonia.

5. The method of claim 1 wherein said period of time is sufficient to exchange at least 0.05 percent by weight of metal with a constituent of said zeolite.

6. The method of claim 1 wherein said solution is an aqueous solution.

7. The method of claim 1 wherein said solution is an organic solvent solution.

8. The method of claim 1 wherein said zeolite is selected from the group consisting of Beta, ZSM-4, ZSM-5, ZSM-11, ZSM-12, ZSM-23, ZSM-35, ZSM-38, ZSM-48, mordenite and synthetic faujasite.

9. The method of claim 1 wherein said solution is an aqueous solution containing a $Co(NH_3)_4(CO_3)^+$ ion.

10. The method of claim 1 wherein said solution is an aqueous solution containing a divalent chromium ion.

11. The method of claim 1 wherein said solution is a non-aqueous solution of ferrocene.

12. The method of claim 1 wherein said solution is a non-aqueous solution of ferrocinium ion.

13. The method of claim 1 wherein said solution is a non-aqueous solution of bis (benzene) chromium.

14. The method of claim 1 wherein said solution is a non-aqueous solution of the singly oxidized derivative of a metal complex selected from the group consisting of ferrocene, and bis (benzene) chromium.

15. The process of claim 1 wherein said zeolite has a silica to alumina ratio greater than about 1600.

16. The process of claim 1 wherein said zeolite contains no measurable amount of aluminum.

17. The process of claim 1 wherein after said step of contacting the resultant product is calcined.

18. The product prepared by the process of claim 1, 2, 3, 4, 5, 6, 7, 8, 9, 10, 11, 12, 13, 14, 15, 16, or 17.

* * * * *